(12) United States Patent
Ezawa et al.

(10) Patent No.: US 7,729,258 B2
(45) Date of Patent: Jun. 1, 2010

(54) SWITCHING DEVICE (75) Inventors: Masatoshi Ezawa, Ome (JP);
Masamichi Andou, Fussa (JP);
Hisakazu Date, Ome (JP)

(73) Assignee: Hitachi, Ltd., Tokyo (JP)

( * ) Notice: Subject to any disclaimer, the term of this patent is extended or adjusted under 35 U.S.C. 154(b) by 333 days.

(21) Appl. No.: 11/754,960

(22) Filed: May 29, 2007

(65) Prior Publication Data
US 2007/0280278 A1 Dec. 6, 2007

(30) Foreign Application Priority Data
May 30, 2006 (JP) ............................. 2006-149107

(51) Int. Cl.
*H04L 12/26* (2006.01)
*G08C 15/00* (2006.01)

(52) U.S. Cl. .................. 370/235; 370/229; 370/422

(58) Field of Classification Search ............... 370/235, 370/422, 389, 468, 229
See application file for complete search history.

(56) References Cited

U.S. PATENT DOCUMENTS

| | | | | |
|---|---|---|---|---|
| 4,058,672 | A * | 11/1977 | Crager et al. ................ 370/394 |
| RE31,182 | E * | 3/1983 | Crager et al. .................. 178/3 |
| 6,349,097 | B1 * | 2/2002 | Smith .......................... 370/390 |
| 6,493,315 | B1 * | 12/2002 | Simpson et al. ............. 370/229 |
| 6,754,216 | B1 * | 6/2004 | Wong et al. ............. 370/395.42 |
| 6,957,273 | B2 * | 10/2005 | Haneda et al. ............... 709/240 |
| 6,963,563 | B1 * | 11/2005 | Wong et al. .................. 370/389 |
| 7,102,999 | B1 * | 9/2006 | Sindhu et al. ................ 370/235 |
| 7,218,638 | B2 * | 5/2007 | Moll ........................... 370/395.4 |
| 7,243,177 | B1 * | 7/2007 | Davis et al. .................. 710/106 |
| 7,319,669 | B1 * | 1/2008 | Kunz et al. ................... 370/235 |
| 7,334,071 | B2 * | 2/2008 | Onufryk et al. .............. 710/312 |
| 7,366,802 | B2 * | 4/2008 | Seto ............................ 710/52 |
| 7,489,699 | B2 * | 2/2009 | Sindhu et al. ................ 370/401 |
| 7,502,881 | B1 * | 3/2009 | Davis .......................... 710/120 |
| 2004/0100954 | A1 * | 5/2004 | Dai et al. ..................... 370/389 |
| 2005/0025119 | A1 * | 2/2005 | Pettey et al. ................. 370/351 |
| 2006/0007944 | A1 * | 1/2006 | Movassaghi et al. ........ 370/401 |
| 2006/0251096 | A1 * | 11/2006 | Metsker ....................... 370/422 |
| 2007/0041319 | A1 * | 2/2007 | Chilukoor et al. ........... 370/235 |
| 2007/0211746 | A1 * | 9/2007 | Oshikiri et al. .............. 370/437 |
| 2007/0268931 | A1 * | 11/2007 | Shaikli ........................ 370/468 |
| 2007/0291754 | A1 * | 12/2007 | Okagawa et al. ............ 370/389 |
| 2008/0291825 | A1 * | 11/2008 | Kendall et al. ............... 370/230 |
| 2008/0307150 | A1 * | 12/2008 | Stewart et al. ............... 710/317 |

FOREIGN PATENT DOCUMENTS

| | | |
|---|---|---|
| JP | 7-264242 A | 10/1995 |
| JP | 2001-320385 A | 11/2000 |
| JP | 2003-18188 A | 1/2003 |

* cited by examiner

*Primary Examiner*—Chi H Pham
*Assistant Examiner*—Robert Lopata
(74) *Attorney, Agent, or Firm*—Miles & Stockbridge P.C.

(57) ABSTRACT

A multiport switch circuit which performs transfer according to flow control and a protocol with an ordering rule specified, wherein the circuit for avoiding packets from clogging is realized in a small size. A packet receiving side circuit has a packet selection output circuit to suppress a circuit size by decreasing the number of transfer data paths, and the packet selection output circuit performs output of selected packets according to a priority packet type selection instruction signal in addition to output of a receiving order packet according to a receiving order output instruction signal to make it possible to avoid clogging caused because the packets made to wait for transmission by the flow control cannot be overtaken by another packet type according to the ordering rule.

8 Claims, 10 Drawing Sheets

SWITCHING DEVICE

INCORPORATION BY REFERENCE

The present application claims priority from Japanese application JP2006-149107 filed on May 30, 2006, the content of which is hereby incorporated by reference into this application.

BACKGROUND OF THE INVENTION

The present invention relates to a switching device or a transfer processing apparatus for performing the flow control of multiple packet types and each of the packet types and the transfer of the packets according to a common protocol specifying ordering rules among the packet types, and more particularly to a switch circuit comprising three or more ports.

PCI Express is a name of a bus which is standardized as a succeeding standard of the PCI so as to be a standard expansion bus available for the computers in general and particularly a data transfer bus which is characterized by high-speed data transfer and serial transfer which enable full-duplex transmission at 2.5 Gbps or more in one direction.

The PCI Express covers mainly three types of packets such as Posted, NonPosted and Completion. The Posted is mainly used to reply to a write request, the NonPosted is mainly used to reply to a read request, and the Completion is used to reply to a read request.

To transfer packets, a transmitter RAM and a receiver RAM are used. To transmit the packets from the transmitter RAM to a communication path, flow control is performed to recognize the available state of the receiver RAM on a part of the transmitting side and to control the packet transmission timing in order to prevent the receiver RAM of a destination device from overflowing. The receiving side notifies the remainder capacity of the receiver RAM to the transmitting side when the packet is read from the transmitter RAM or on a timely basis. The transmitting side compares the remainder capacity of the receiver RAM notified from the receiving side with a transmission-scheduled packet size, and if the remainder capacity of the receiver RAM is smaller than the transmission-scheduled packets, the packet transfer is waited until the receiver RAM has an available space. By controlling as described above, the receiver RAM is prevented from overflowing.

In a case where the flow control is performed for each packet type, the ordering rules specify whether or not a packet type, which is held in a waiting state by the flow control, can be overtaken by the following packet type. Typical examples include "Posted must overtake another NonPosted" and "NonPosted should not overtake Posted." They are used in order to prevent a deadlock or to keep consistency of data.

For example, it may be assumed that a write is performed from the CPU to the memory, a read is performed from the CPU to the memory, and comparison is performed between the write data previously performed and the read data returned from the memory. If a write request Posted from the CPU is overtaken by a read request Non-Posted, the comparison cannot be performed properly. To prevent such a situation, the ordering rules are specified between the packets.

In a switch circuit comprising three or more ports for performing the transfer of packets according to the PCI Express protocol, a packet type which is in a transfer waiting state according to the flow control might not be overtaken by another packet type according to the ordering rules. Therefore, another packet type, which is not directly subjected to a transfer waiting state by the flow control, also falls in a transfer waiting state.

Where the transfer waiting state is caused by the flow control, the flow control to one packet type having a particular device as a destination has an effect on another packet having the same device as a destination and also on a packet having another device as a destination. Thus, the switch circuit as a whole is clogged because of the packets which are made to be in a transfer waiting state by the flow control.

As a method of preventing the clogging of the switch circuit as a whole due to the above-described packet transfer waiting state, there is a method that when the packets received through individual ports are transferred to another port, the packets are temporarily stored in an intermediate RAM. For example, JP-A-07-264242 has proposed a method that a low-speed large-scale RAM and a high-speed small-scale RAM are adopted as the intermediate RAMs to improve packet transfer efficiency. As another method, provision of a transfer data path in the switch circuit for each packet type allows to transfer without an influence of another packet type.

JP-A-2001-320385 has proposed a method that the packets received by a receiver unit according to the PCI standard are stored in a RAM according to each priority determined for each packet type, a transmission request is sent to the transmitter unit, the replay of a transmission permission signal from the transmitter unit is checked, and the packets are transferred. Use of this method enables to transfer a high priority packet type with a transmission request cancelled if the transmission permission signal to a low priority packet type is not replied.

JP-A-2003-18188 has proposed a method that packets are divided depending on packet types and stored in RAMs, and the priority sequences of the individual RAM outputs are changed by a logical flow control mechanism, so that when a high priority packet is made to wait for transfer, the transfer of a packet having the same destination as that of the packet in a transfer waiting state and a packet addressed to another device is free from any influence.

Figure 9:
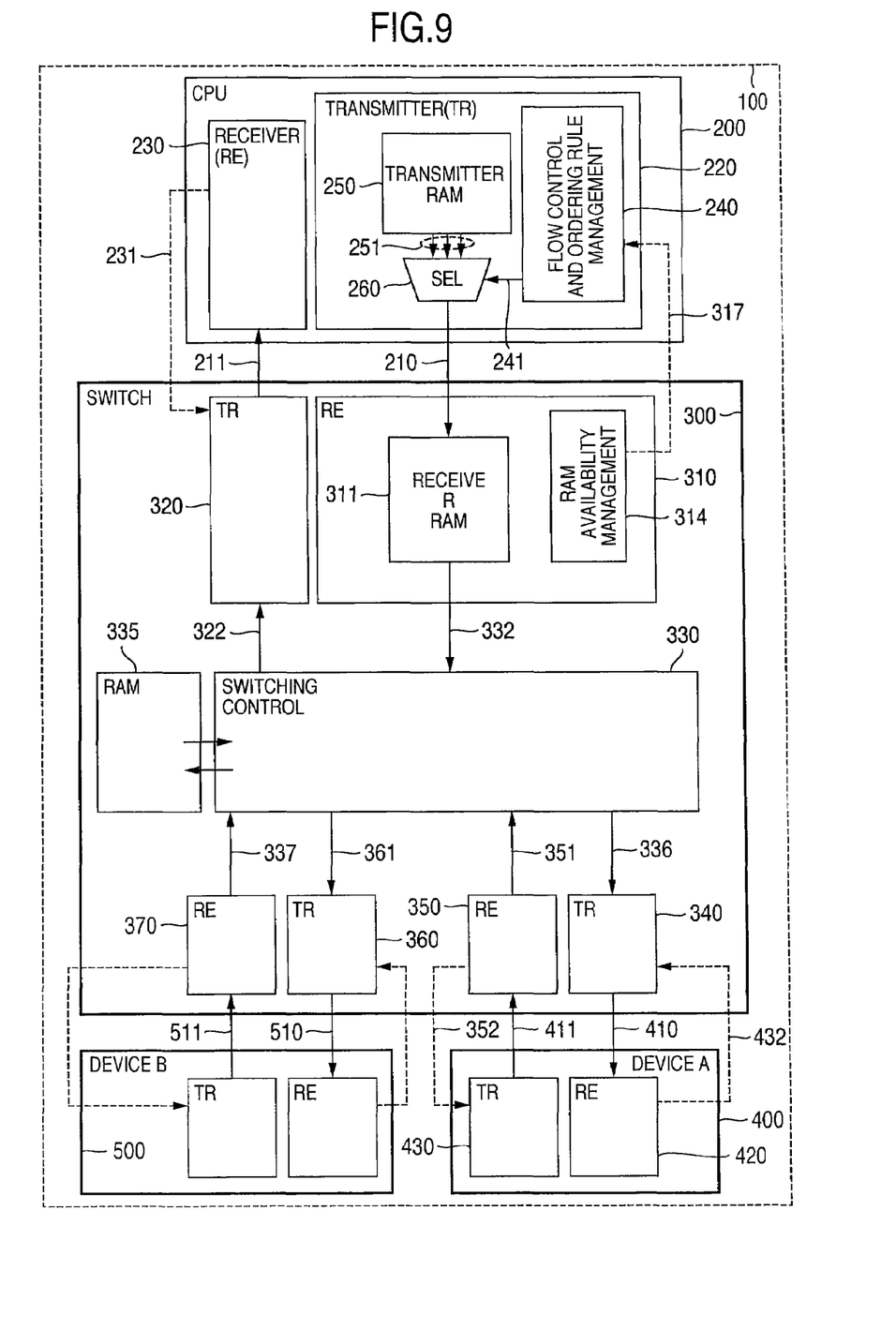
FIG. 9 is a block diagram of a switch circuit having an intermediate RAM using an existing technology.
Figure 10:
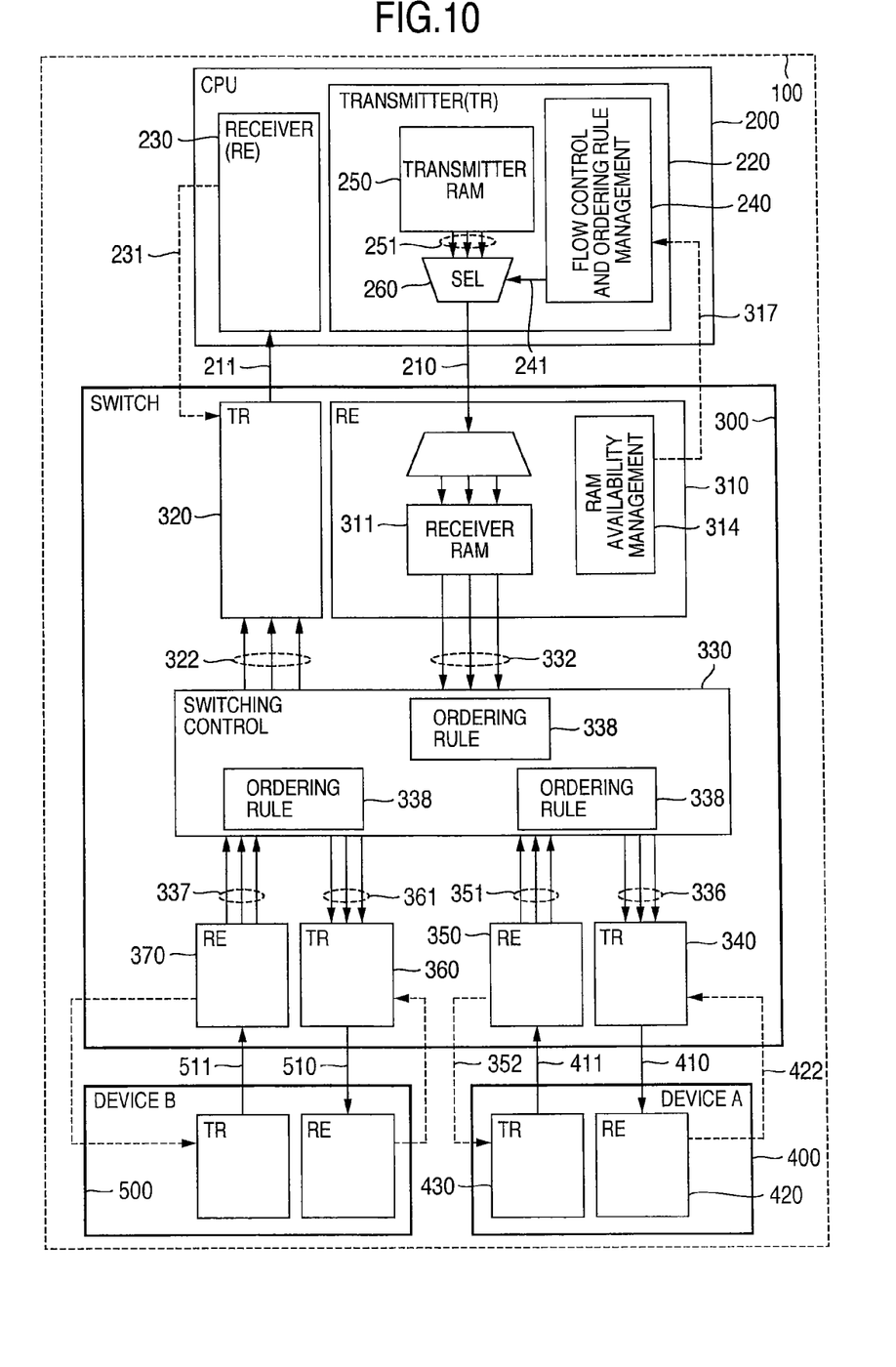
FIG. 10 is a block diagram of a switch circuit having paths for packet types using an existing technology.

But, when the switch circuit has therein the intermediate RAM as shown in FIG. 9 of the above-described related art, e.g., JP-A-07-264242, the clogging of the switch circuit due to the flow control and the ordering rule can be prevented, but there is a problem that the transfer speed of the switch circuit becomes slow at all times because of routing through the intermediate RAM even if there is no occurrence of the transfer waiting by the flow control in comparison with a case not being routed via the intermediate RAM.

Where a transfer data path within the switch circuit shown in FIG. 10 is provided for each packet type, the packets can be transferred without being influenced by the transfer waiting state of another packet type but there is a possibility that the order of the packets transferred to the transmitter RAM of the switch circuit is different from the order of reaching the receiver RAM of the switch circuit. Therefore, it is necessary to manage the arrival sequence of the receiving packets on a part of the transmitter RAM, and an additional control circuit is required.

In either case, the logical scale of the switch circuit becomes large, and the number of ports mountable in a unit area becomes small. Reduction of the logical scale of the switch circuit which tends to have a multiport is an important proposition, and measures are demanded to be taken with the logical scale suppressed.

SUMMARY OF THE INVENTION

The present invention has been made in view of the above circumstances and provides a switch circuit which can be highly integrated by a small-size circuit while realizing avoidance of clogging which is caused if a packet type put in a transfer waiting state by the flow control cannot be overtaken by another packet type according to the ordering rules.

Among the aspects of the invention disclosed in this application, representative ones will be described briefly below.

The switch circuit of the invention has a selector for section of a packet on a part of a receiver RAM so as to have a single data path within the switch circuit and has functions to transfer packets to the transmitter RAM according to the receiving order to the receiver RAM at the time of ordinary transfer, and to transfer a desired packet type to the transmitter RAM in case of occurrence of clogging, thereby achieving the above-described object. And, to select a priority transfer packet, destination information of the packet is used in addition to arrival information and a RAM FULL signal, so that overtaking of a packet between different devices of the same packet type can be realized by a small-size circuit.

According to the present invention, output data paths of receiver RAMs disposed for individual packet types are narrowed down by a selector to decrease the data paths in the switch circuit to a single line, normal transfer is performed according to the receiving order, and if clogging occurs, an arbitrary packet type is transferred to avoid the packets from clogging by a small-size circuit. Thus, a high-integration switch circuit can be provided.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention will be described with reference to the accompanying drawings.

Figure 1:
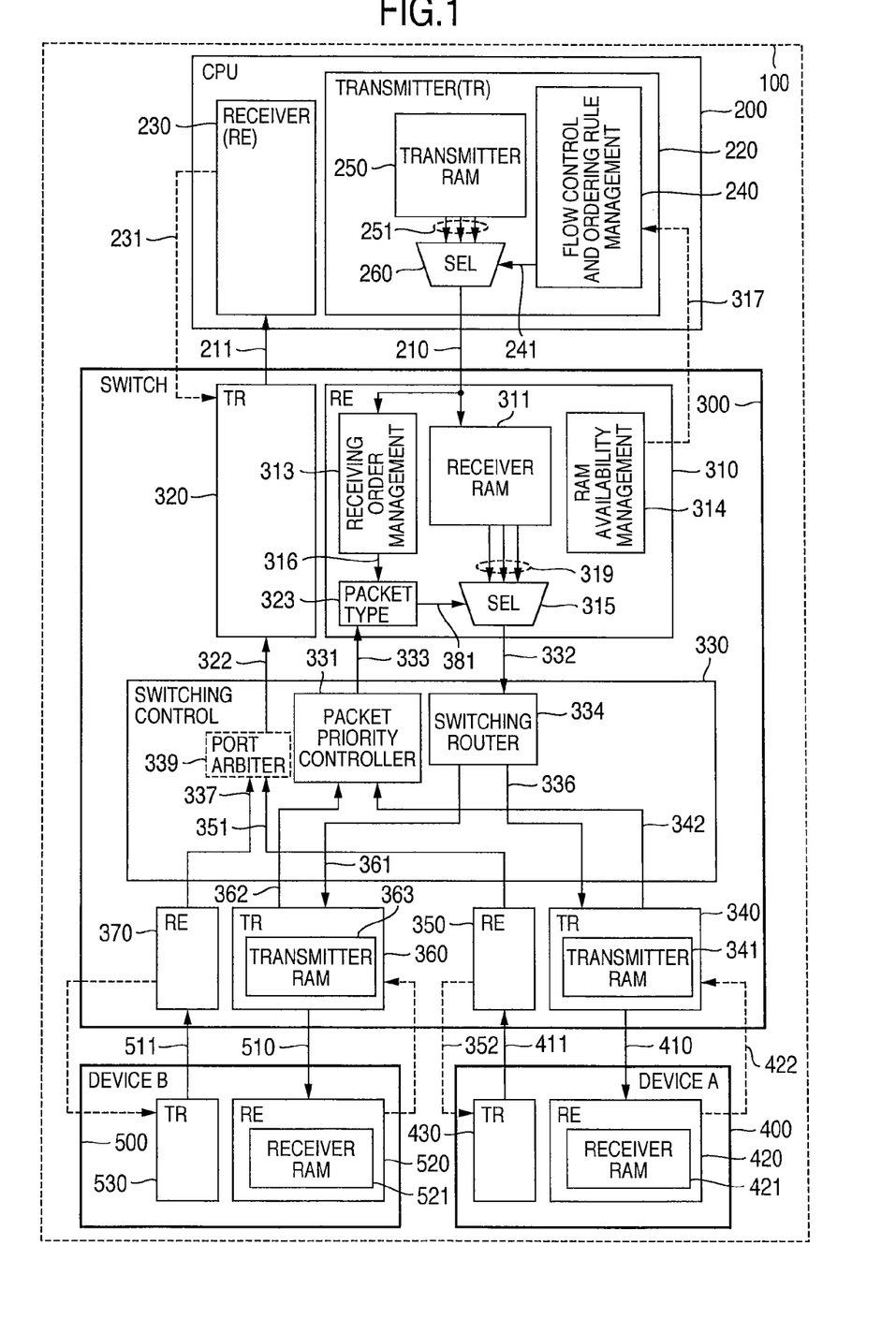
FIG. 1 is a block diagram of a switch circuit according to an embodiment of the invention.

FIG. 1 is a block diagram of an information processing apparatus 100 using a switch circuit 300 of the invention. The information processing apparatus 100 comprises a CPU 200, the switch circuit 300, a device A 400, and a device B 500. The CPU 200 and the switch circuit 300 are mutually connected through a receiving-from-CPU route 210 and a transmitting-to-CPU route 211, the device A 400 and the switch circuit 300 are mutually connected through a transmitting-to-Device A route 410 and a receiving-from-Device A route 411, and the device B 500 and the switch circuit 300 are mutually connected through a transmitting-to-Device B route 510 and a receiving-from-Device B route 511.

It is assumed that the information processing apparatus 100 is a general-purpose computer system, the device A 400 is a storage medium control device, and the device B 500 is an image processing control device, and it is conceived to perform an information processing operation that data from the storage medium control device as the device A 400 is computed by the CPU 200 to output to the image processing control device as the device B 500.

When it is assumed to perform a PCI Express operation, the conceivable packet types include Posted mainly used for a write request, NonPosted used for a read request, and Completion used for reply of read data.

The CPU 200 comprises a CPU transmitter unit 220, a CPU receiver unit 230, a flow control and ordering rule management unit 240, a CPU transmitter RAM 250, and a packet selector 260. The packets generated by the CPU 200 are stored for the individual packet types in the CPU transmitter RAM 250 and outputted for the individual packet types through a CPU transmitting route 251. The flow control and ordering rule management unit 240 refers to a receiver-from-CPU RAM remainder capacity signal 317 which is a signal indicating the remainder capacity of each packet type of a receiver-from-CPU RAM 311 which is a packet destination, and if the remainder capacity of the receiver-from-CPU RAM 311 corresponding to the destination transmission-scheduled packet type is smaller than the transmission-scheduled packet type, waiting of the transmission packet by the flow control is performed for each packet type so that the receiver-from-CPU RAM 311 does not overflow. And, the flow control and ordering rule management unit 240 outputs a transmission packet control signal 241 so that another packet type does not overtake in violation of the ordering rule during the time of waiting by the flow control. The packet selector 260 refers to the transmission packet control signal 241 and transmits the instructed packet type to the switch circuit 300 through the receiving-from-CPU route 210.

The switch circuit 300 is a switch circuit for performing packet transfer between CPU 200 and device A 400 and device B 500. The packets sent from CPU 200 are stored in the receiver-from-CPU RAM 311 and outputted for the individual packet types to a packet selection output circuit 315. The packet selection output circuit 315 refers to a transfer packet instruction signal 381 outputted from a packet type instruction circuit 323 to select and output the transfer packet types. The packet type instruction circuit 323 refers to a receiving order output instruction signal 316 and a priority packet type selection instruction signal 333 to select the transfer packet type. At this time, where the priority packet type selection instruction signal 333 indicates a priority transfer packet type, the packet type designated by the priority packet type selection instruction signal 333 is selected, and where the priority packet type selection instruction signal 333 indicates the receiving order transfer, the packet type indicated by the receiving order output instruction signal 316 is selected. The packet selected and outputted by the packet selection output circuit 315 is stored in a transmitter-to-Device A unit 340 through a switching control unit 330 and transferred to the transmitting-to-Device A route 410 or stored in a transmitter-to-Device B unit 360 and transferred to the transmitting-to-Device B route 510.

Device A 400 is comprised of a device A receiver unit 420 and a device A transmitter unit 430. The device A receiver unit 420 stores the packets transferred through the transmitting-to-Device A route 410 for each packet type into a device A receiver RAM 421 and performs a requested processing. And, the remainder capacity of the device A receiver RAM 421 is outputted as a device A receiver RAM remainder capacity signal 422 for every packet type. The device A transmitter unit 430 stores therein transmission packets for every packet type and transmits the packets to a receiver-from-Device A unit 350 through the receiving-from-Device A route 411. At this time, the available capacity of the receiver-from-Device A unit 350 corresponding to transmission-scheduled packet types is checked by referring to a receiver-from-Device A RAM remainder capacity signal 352 for every packet type. If the available capacity of the receiver-from-Device A unit 350 corresponding to the transmission-scheduled packet type is smaller than the transfer packet size, transmission is waited for each packet type by the flow control. In this embodiment, the device A receiver RAM remainder capacity signal 422 is used to notify the remainder capacity of the receiver RAM for every packet type, but the receiving-from-Device A route 411 may be used to notify, and the transmitting-to-Device A route 410 may be used to notify instead of the receiver-from-Device A RAM remainder capacity signal 352.

Then, the switch circuit 300 of the invention will be described in detail. The switch circuit 300 is comprised of a receiver-from-CPU unit 310, a transmitter-to-CPU unit 320, the switching control unit 330, the transmitter-to-Device A unit 340, the receiver-from-Device A unit 350, the transmitter-to-Device B unit 360, and a receiver-from-Device B unit 370.

Figure 2:
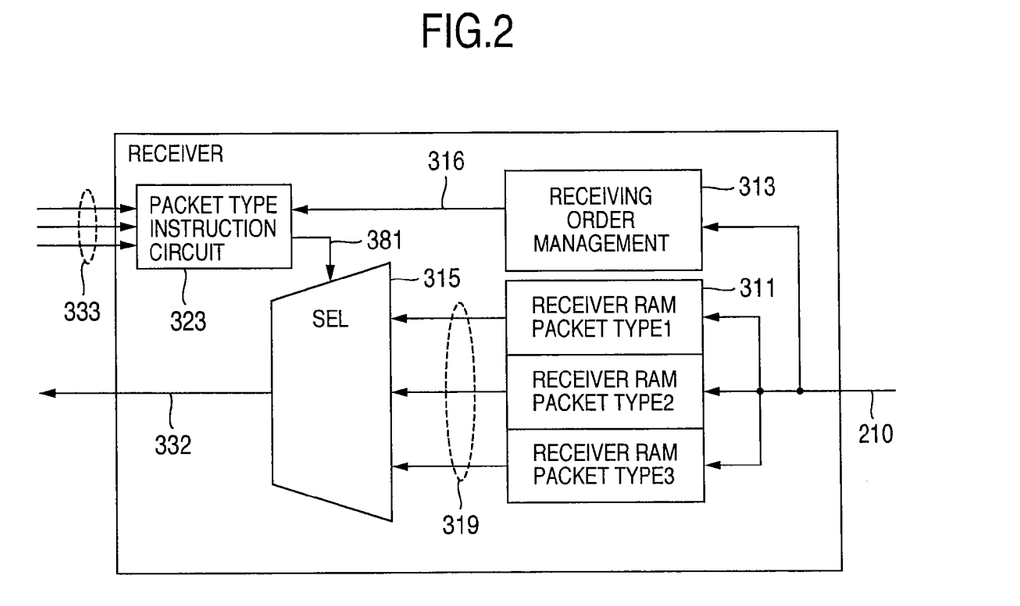
FIG. 2 is a detail view of a packet selection output circuit according to an embodiment of the invention.

The receiver-from-CPU unit 310 stores the packets transferred through the receiving-from-CPU route 210 into the receiver-from-CPU RAM 311 for every packet type, and stores the simultaneously stored arrival information about every packet into a receiving order management unit 313. When the packets are stored in the receiver RAM 311, the arrival information indicating the receiving order to the receiver RAM 311 is added and stored. In other words, the receiving order management unit 313 manages the order of the individual packets arrived from the CPU 200 to the receiver RAM 300. By using the arrival information, the first-arrived packet at that time can be determined when the packet is outputted from the packet selection output circuit 315. As shown in FIG. 2, the receiver RAM 311 from CPU reads the packets written for every packet type according to the arrived order, namely manages every packet type on an FIFO (First-In-First-Out) basis. In other words, the receiving order management unit 313 manages the receiving order to the receiver 310 from CPU regardless of the packet types, and the receiver RAM 311 from CPU manages every packet type on an FIFO basis.

The packets stored in the receiver-from-CPU RAM 311 are outputted from the switch circuit to the packet selection output circuit 315 through a receiver RAM transfer route 319 for every packet type, and selected and outputted to a transmitting-to-switch circuit receiver unit route 332 with reference to the receiving order output instruction signal 316 outputted from the receiving order management unit 313 and the priority packet type selection instruction signal 333 outputted from a priority packet type selection instruction unit 331. When the priority packet type selection instruction signal 333 indicates the transmission in the receiving order, the packet selection output circuit 315 selects transmission packet types in the receiving order to the receiver-from-CPU unit 310 according to the receiving order output instruction signal 316, and when the priority packet type selection instruction signal 333 indicates the transmission of the priority packet type, the packet selection output circuit 315 transmits the priority packet indicated by the priority packet type selection instruction signal 333. And, for the flow control, the remainder capacity of the receiver-from-CPU RAM 311 for every packet type is notified from a remainder capacity management unit 314 to the CPU transmitter unit 220 by the receiver-from-CPU RAM remainder capacity signal 317 when the receiver-from-CPU RAM 311 is read or on a timely basis.

The transmitter-to-CPU unit 320 receives the transmission packets through a receiving-from-Switch circuit transmitter unit route 322, holds them therein for every packet type, and outputs to the CPU 200 through the transmitting-to-CPU route 211. At this time, a CPU receiver RAM remainder capacity signal 231 indicating the remainder capacity of the CPU receiver RAM for every packet type is referred to, and if the remainder capacity of the receiver RAM corresponding to the transmission-scheduled packet type is smaller than the size of the transmission-scheduled packet type, transmission for every packet type is waited by the flow control. In this embodiment, the remainder capacity of the receiver RAM for every packet type is notified using the CPU receiver RAM remainder capacity signal 231 but may be notified through the receiving-from-CPU route 210, and the transmitting-to-CPU route 211 may be used instead of the receiver-from-CPU RAM remainder capacity signal 317 to notify.

The switching control unit 330 refers to the address within the packet header by a switching router 334 for the packet transferred through the transmitting-to-Switch circuit receiver unit route 332 to transfer to the transmitter-to-Device A unit 340 using a transmitting-to-Transmitter-to-Device A RAM route 336 or to the transmitter-to-Device B unit 360 using a transmitting-to-transmitter-to-Device B RAM route 361. And, the packets transferred from the receiver-from-Device A unit 350 and the receiver-from-Device B unit 370 are transferred to the transmitter-to-CPU unit 320 through a receiving-from-Receiver-from-Device A RAM route 351 or a receiving-from-Receiver-from-Device B RAM route 337, a port arbitration 339 and the receiving-from-Switch circuit transmitter unit route 322. And, a transmitter RAM FULL signal indicating an available space state of the transmitter RAM is prepared for every packet type. The priority packet type selection instruction unit 331 refers to a transmitter-to-Device A RAM FULL signal 342 for every packet type and a transmitter-to-Device B RAM FULL signal 362 for every packet type, and if a FULL state of the transmitter RAM is detected, the priority packet type selection instruction signal 333 is used to designate a priority transfer packet type according to the ordering rules. Monitoring of the available space state of the transmitter RAM for every packet type allows to determine a priority transfer packet according to the ordering rules. For example, when the ordering rule specifies that the write packet type may overtake the read packet type, the FULL state of the read packet type transmitter RAM is detected according to the transmitter RAM FULL signal, and the write packet type can be instructed as the priority transfer packet type to the packet selection output circuit 315.

The transmitter-to-Device A unit 340 holds the packet transferred through the transmitting-to-Transmitter-to-Device A RAM route 336 for every packet type in a transmitter-to-Device A RAM 341, and transmits through the transmitting-to-Device A route 410. At this time, the device A receiver RAM remainder capacity signal 422 for every packet type is referred to, and if the available capacity of the device A receiver RAM 421 corresponding to a transmission-scheduled packet type is smaller than the transmission-scheduled packet type, the transfer is waited for every packet type by the flow control. Here, it is also controlled in the same manner as in the CPU transmitter unit 220 so that another packet type does not overtake in violation of the ordering rule during the waiting state according to the flow control. And, the available capacity of the transmitter-to-Device A RAM 341 for every packet type is monitored, and when the available capacity is lost, the transmitter-to-Device A RAM FULL signal 342 corresponding to the transmitter RAM with the available capacity lost for the packet type is asserted.

The receiver-from-Device A unit 350 holds therein the packets transmitted through the receiving-from-Device A route 411 for every packet type and transfers to the switching control unit 330 through the receiving-from-Receiver-from-Device A RAM route 351.

The transmitter-to-Device B unit 360 and the receiver-from-Device B unit 370 perform the same operations as those of the transmitter-to-Device A unit 340 and the receiver-from-Device A unit 350. As described above, the packet select function in the receiving order using the above arrival information and the priority transfer packet type select function using the above transmitter RAM FULL signal are realized by the packet selection output circuit 315, so that a transfer data path from the packet selection output circuit 313 and following routes can be determined to be a single line, and a switch circuit that realizes overtaking among the packets by a small-size circuit according to the ordering rules can be provided.

FIG. 2 shows in detail the packet selection output circuit 315. The packet types described here are three. The packets transferred through the receiving-from-CPU route 210 are stored in the receiver-from-CPU RAM 311 for every packet type based on the packet type information stored in the header within the packets. The packets outputted from the receiver-from-CPU RAM 311 through the transferring switch circuit receiver RAM route 319 are selected by the packet selection output circuit 315 and outputted to the transmitting-to-Switch circuit receiver unit route 332. Based on arrival information indicating the receiving order of the packets from CPU 200 to the receiver RAM 311, the receiving order output instruction signal 316 indicating the packet type to be transmitted from the receiving order management unit 313 is outputted. When the priority packet type selection instruction signal 333 from the priority packet type selection instruction unit 331 instructs the selection of packets in the receiving order, the packet type instruction circuit 323 instructs the packet selection output circuit 315 by the transfer packet instruction signal 381 indicating the packet type to be transmitted according to the receiving order output instruction signal 316. The receiver RAM 311 manages every packet type on an FIFO basis, so that only the packet types to be transmitted using the transfer packet instruction signal 381 may be instructed to the packet type selection output circuit 315. The packet type selection output circuit 315 selects and outputs the packet to be transmitted according to the transfer packet instruction signal 381 to the transmitting-to-Switch circuit receiver unit route 332. According to arrival information indicating the receiving order of the packets from the CPU 200 to the receiver RAM 311, the receiving order management unit 313 instructs the packet types to be transferred by the receiving order output instruction signal 316, and the receiver RAM manages every packet type on an FIFO basis. As a result, selection and output are performed according to the packet receiving order from the receiver RAM to the transmitting-to-Switch circuit receiver unit route 332 and from the CPU 200 to receiver RAM 311.

In a case where the priority packet type selection instruction signal 333 from the priority packet type selection instruction unit 331 indicates a packet type to be transferred with priority, the packet type to be transferred is instructed to the packet type selection output circuit 315 according to the transfer packet instruction signal 381. The packet type selection output circuit 315 selects and outputs the packet to be transmitted to the transmitting-to-Switch circuit receiver unit route 332 according to the transfer packet instruction signal 381. The receiver RAM manages every packet type on an FIFO basis, so that only the packet type to be transferred with priority is selected and outputted from CPU 200 to the receiver RAM 311 according to the packet receiving order.

Figure 3:
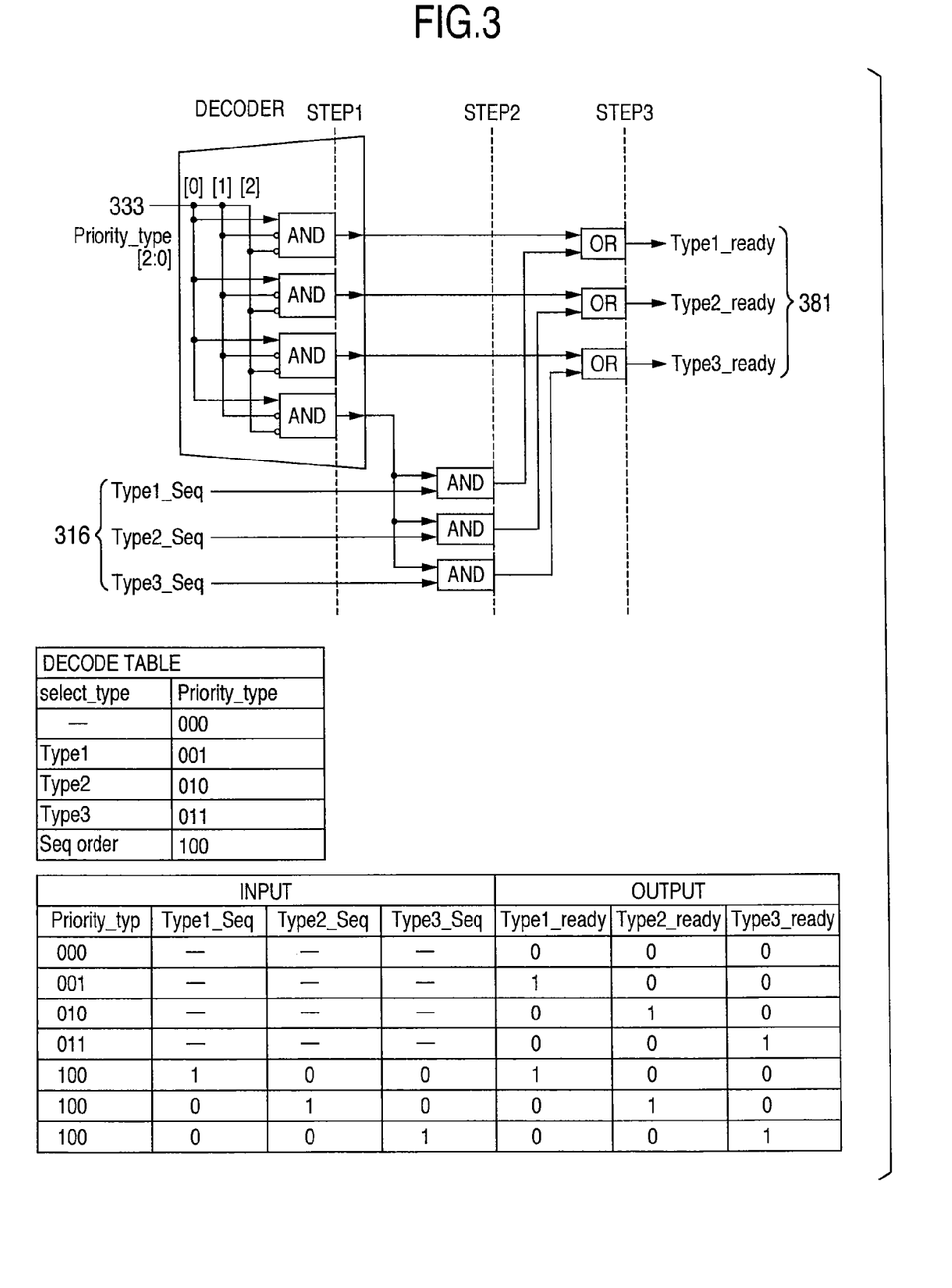
FIG. 3 is a packet type instruction circuit having a decoder.

FIG. 3 shows a circuit configuration of the packet type instruction circuit 323 using a decoder. Here, if it is desired to transfer packet types not in the receiving order, the priority packet type selection instruction signal 333 (indicated as Priority_type [2:0] in FIG. 3) is determined to have a value corresponding to each packet type, and the transfer packet instruction signal 381 corresponding to the packet type is asserted. For example, where it is desired to select a Type 1 packet, the priority packet type selection instruction signal 333 is determined to be "001", and the corresponding transfer packet instruction signal 381 is asserted. Where the packets are transferred in the receiving order, the priority packet type selection instruction signal 333 is determined to be "100", the packet type indicated by the receiving order output instruction signal 316 is selected, and the transfer packet instruction signal 381 corresponding to the packet type is asserted.

For switching between the packet type selection and the priority packet type selection in the receiving order instructed by the priority packet type selection instruction signal 333, it is general to use the circuit using a decoder as shown in FIG. 3. This configuration has an advantage that it is effective for suppression of a circuit scale because an increase in bit width of the priority packet type selection instruction signal 333 to be inputted into the decoder is small when the packet types to be selected are increased. But, in this configuration, the number of gate stages of the decoder unit increases with the increase of the bit width of the priority packet type selection instruction signal 333, and possibly a delay is increased.

Figure 4:
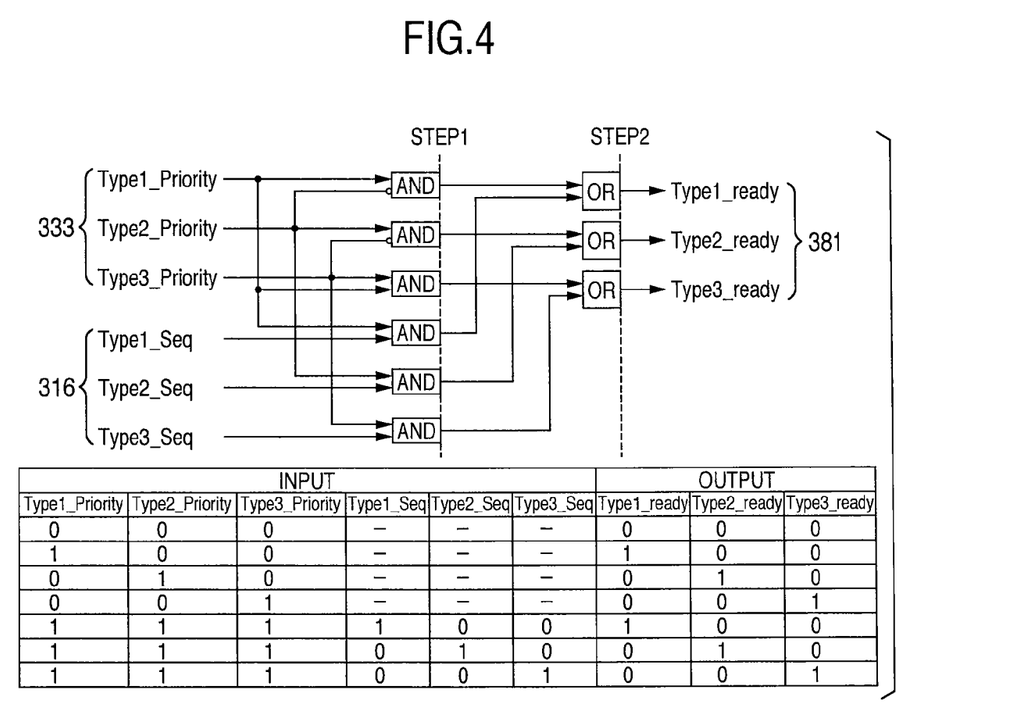
FIG. 4 is a packet type instruction circuit according to an embodiment of the invention.

FIG. 4 shows a circuit configuration of the packet type instruction circuit 323 that the priority packet type selection instruction signal 333 has one-to-one correspondence with the packet type to be selected without using the decoder. At this time, a signal indicating the packet selection in the receiving order is not separately prepared on the part of the priority packet type selection instruction signal 333, and switching between the packet selection and the priority packet type selection in the receiving order is generated by a combination of the same signal groups. In this circuit, at the time of the priority packet type selection, the priority packet type selection instruction signal 333 corresponding to the packet type is asserted by one bit.

For example, when it is desired to transfer the packet type of Type 1, the corresponding priority packet type selection instruction signal 333 (Type 1_Priority) is asserted, so that a corresponding transfer packet instruction signal 381 (Type 1_ready) is asserted. And, at the time of the packet selection in the receiving order, the packet type indicated by the receiving order output instruction signal 316 is selected by asserting the priority packet type selection instruction signal 333 by all bits, and the transfer packet instruction signal 381 corresponding to the packet type is asserted. It is an advantage of this configuration that it is effective for suppression of a delay because a decoder is not used, so that the number of gate stages can be suppressed. And, since a signal indicating the packet selection in the receiving order is not separately prepared, a circuit size can be suppressed from increasing. Even if a signal indicating the packet section in the receiving order is separately prepared, a circuit size for the signal indicating the packet selection in the receiving order increases, but it is possible to have a configuration that the number of gate stages is suppressed and the delay is decreased.

By the above-described method, it is generally possible to designate the packet selection in the receiving order and the priority packet selection at the occurrence of clogging from the switch circuit to prevent the clogging without sacrificing the transfer speed with the circuit size suppressed.

Figure 5:
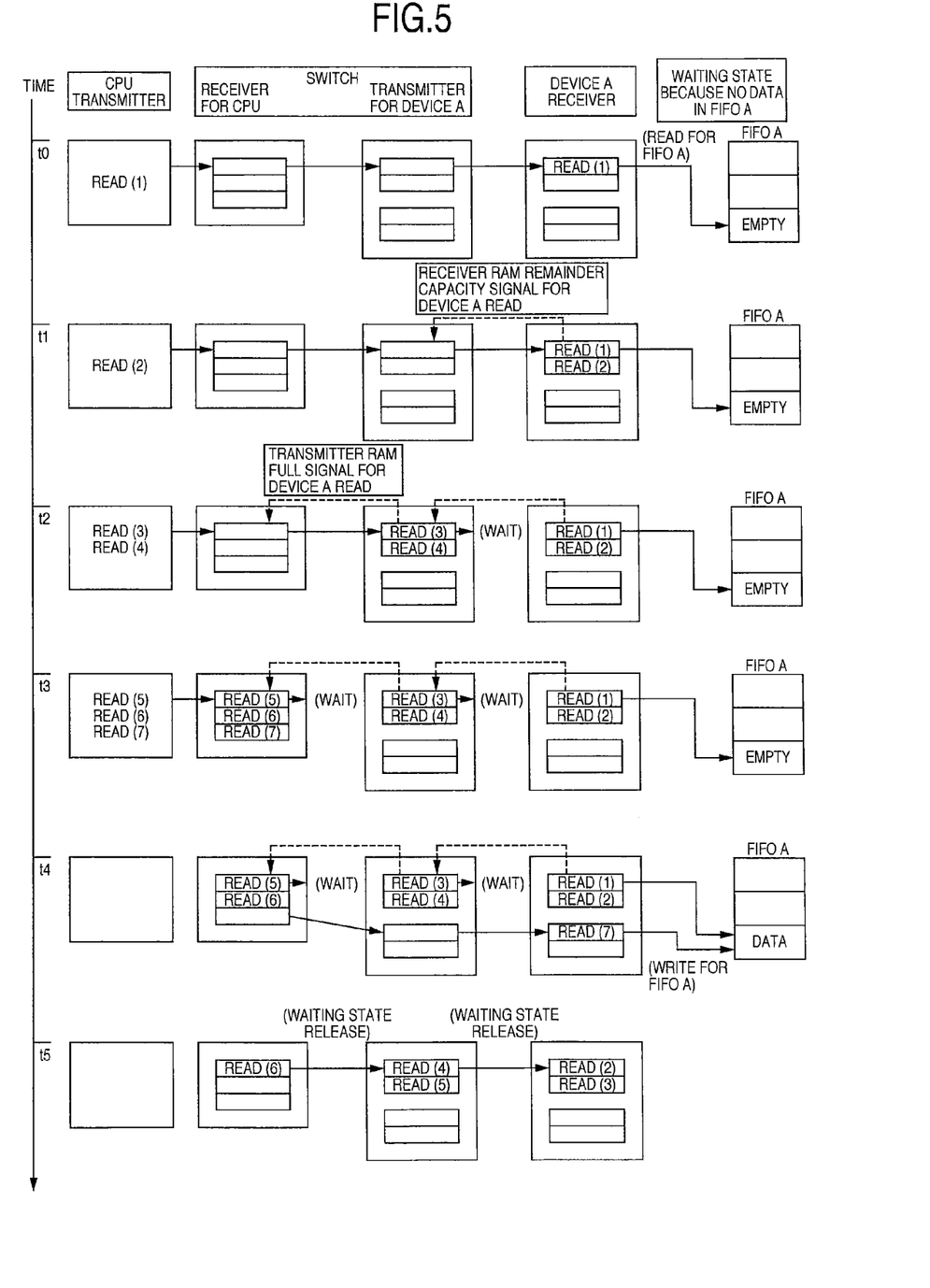
FIG. 5 is a ladder chart at the time of occurrence of overtaking between packets addressed to the same device.

FIG. 5 shows an overtaking state by a priority selection packet at the time of occurrence of clogging. FIG. 5 is a ladder chart when overtaking is performed between the packet types addressed to the same device. The CPU transmitter unit 220, the receiver-from-CPU unit 310, the transmitter-to-Device A unit 340, and the device A receiver unit 420 are positioned from left to right, and a time passage is indicated downward. The packet types described here are two types such as a read request and a write request.

Timing t0 indicates that a read request (1) from the CPU to FIFO A of the device A has reached the device A receiver unit 420 via the receiver-from-CPU unit 310 and the transmitter-to-Device A unit. Here, the read (1) is to read data of the FIFO A, but since FIFO A is still empty, the read request (1) waits in the device A receiver unit 420 until data is written in FIFO A.

Timing t1 indicates that after the read (1), a read request (2) was stored in the device A receiver unit 420 of the device A. The read request (2) is not processed until the read request (1) is processed, so that the read request (2) also remains in the device A receiver unit 420 in the same manner as the read request (1). In this example, the read requests which can be stored in the device A receiver unit 420 are up to two, and the receiver RAM for READ in the device A becomes FULL when the read request (2) is stored. And, the device A notifies the switch circuit by the device A receiver RAM remaining capacity signal 422 that the receiver RAM for READ has become FULL. Having recognized that the receiver RAM for device A READ has become FULL according to the device A receiver RAM remainder capacity signal 422, the transmitter-to-Device A unit 340 waits according to the flow control and suppresses the read transfer to the device A.

Timing t2 indicates that read requests (3) and (4) to the device A are stored in the transmitter-to-Device A unit 340 in order of the read request (3) and the read request (4). The receiver RAM for device A READ is FULL because the read request (1) and the read request (2) have been stored already, and the transmitter unit of the switch circuit which has recognized from the device A receiver RAM remainder capacity signal 422 that the receiver RAM for device A READ is FULL is in a wait state according to the flow control, so that it cannot transmit the read requests (3) and (4) from the transmitter-to-Device A unit 340 onward. Therefore, the read requests (3) and (4) stored in the transmitter-to-Device A unit 340 wait until the waiting by the flow control is released. In this example, the number of read requests that the transmitter-to-Device A unit 340 can store is also two, and the transmitter-to-Device A unit 340 also becomes FULL when the read requests (3) and (4) are stored, so that the transmitter RAM FULL signal for device A READ is outputted from the transmitter-to-Device A unit 340 to the receiver-from-CPU unit 310.

Timing t3 indicates that a read request (5), a read request (6), and a write request (7) to the FIFO A are stored in this order into the receiver-from-CPU unit 310. Here, the read requests (5) and (6) cannot be transferred from the receiver-from-CPU unit 310 to the transmitter-to-Device A unit 340 because the RAM for device A READ in the switch circuit is FULL. In a switch circuit not considering overtaking, the write request (7) cannot overtake the read request (5) and the read request (6), so that the write request (7) cannot be transferred to the transmitter-to-Device A unit 340. Therefore, writing into the FIFO A of the device A cannot be made, falling into a deadlock state. Then, in this circuit, when the transmitter RAM FULL signal for device A READ indicating that the transmitter RAM for device A READ of the switch circuit has become a FULL state is asserted, a write request packet is instructed as a priority transfer packet from the priority packet type selection instruction unit 331, and a write request can be made transferable with priority using the packet selection output circuit 315. Thus, the priority transfer packet is designated from the switch circuit side to select and output from the packet selection output circuit 315. Accordingly, overtaking between the packets is realized with a circuit size suppressed without having an intermediate RAM or paths for packet types.

Timing t4 indicates that the write request (7) having overtaken the read requests (5) and (6) is stored in the device A receiver unit 420 via the transmitter-to-Device A unit 340. The write request (7) having overtaken the read request by the switch circuit of the invention is stored in the receiver RAM for device A WRITE, and writing into the FIFO A is performed. When data is written into the FIFO A, the read request (1) which is a read request to the FIFO A is processed.

Timing t5 indicates that since the read request (1) has been processed, waiting by the flow control is released, and it becomes possible to transfer the clogged read request. Thus, the switch circuit of the invention can be used to realize avoidance of the deadlock by a small-size circuit.

Figure 6:
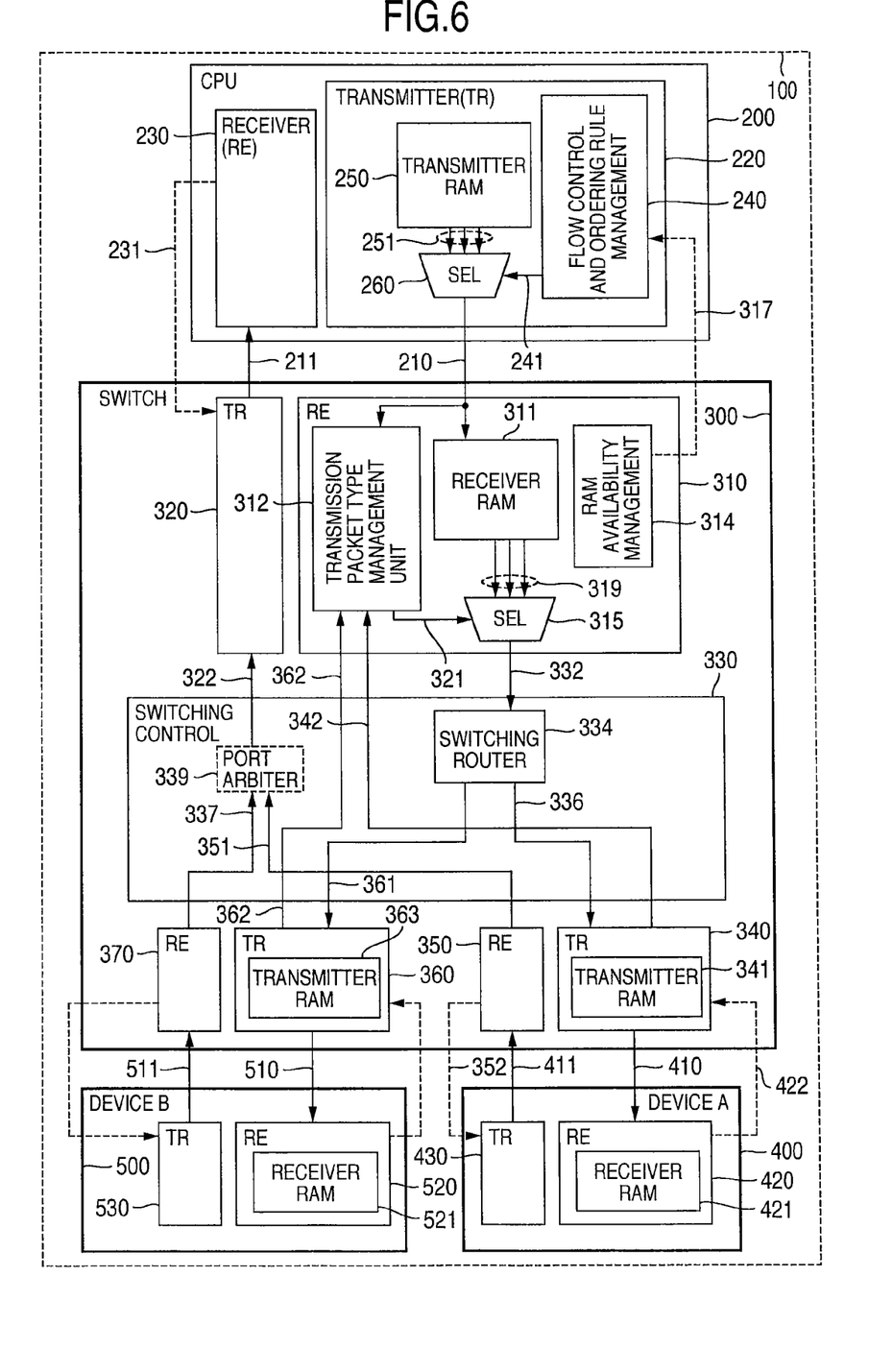
FIG. 6 is a block diagram of a switch circuit according to an embodiment of the invention.

FIG. 6 is another embodiment of the information processing apparatus 100 including the switch circuit 300 using the present invention. The circuit shown in FIG. 1 cannot perform overtaking even if the read request (6) is addressed to the device B, and the arrival of a write request to the FIFO A must be waited. But, in this circuit, a transmission packet type management unit 312 is used instead of the receiving order management unit 313 and the priority packet type selection instruction unit 331 to deal with the overtaking between packets addressed to different devices.

In this circuit, the receiver-from-CPU unit 310 stores the packets transferred from the receiving-from-CPU route 210 into the receiver-from-CPU RAM 311, and at the same time, the receiving order of the packets transmitted from CPU 200 to the receiver RAM and the destination information are stored into the transmission packet type management unit 312. The receiving order management unit 313 shown in FIG. 1 holds only the receiving order of the packets, while the transmission packet type management unit 312 holds the destination information of the packets in addition to the receiving order of the packets. For example, in a case where an ordering rule allows overtaking of the read packet type by the write packet type in the same manner as above, when a port addressed to a certain device indicates a FULL state of the transmitter RAM for the read packet type and the first-arrived packet is a read packet type addressed to another device, the above-described destination information can be used together with the above-described transmitter RAM FULL signal not to instruct the subsequent write packet type as a priority transfer packet type but to instruct such that the packet selection circuit outputs the first-arrived read packet type addressed to another device. And, in a case where a read packet type addressed to a device indicating that the transmitter RAM for the read packet type is in a FULL state has arrived first and a subsequent read packet type addressed to another device and a write packet type addressed to a device indicating that a further subsequent transmitter RAM for the read packet type is in a FULL state have arrived, a read packet type addressed to another device can be instructed as a priority transfer packet type to the above-described packet selection circuit.

The packets stored in the transmitter-to-CPU RAM 311 are outputted to the packet selection output circuit 315 in the same manner as in FIG. 1, the transmission packet type instruction signal 321 outputted from the transmission packet type management unit 312 is referred to, and the packet type indicated by the transmission packet type instruction signal 321 is selected and outputted to the transmitting-to-Switch circuit receiver unit route 332. The transmission packet type management unit 312 instructs the transmission packet types in the receiving order while the transmitter-to-Device A RAM FULL signal 342 and the transmitter-to-Device B RAM FULL signal 362 indicating a FULL state of each packet type of the transmitter-to-Device A RAM 341 and the transmitter-to-Device B RAM 363 are not asserted.

When the transmitter-to-Device A RAM FULL signal 342 and the transmitter-to-Device B RAM FULL signal 362 are asserted, the destination information of the packets stored in the receiver unit of the switch circuit is checked in the receiving order, and a transmission request is outputted with priority given to a packet to a transmitter RAM not having asserted the transmitter RAM FULL signals corresponding to the individual transmitter RAMs, namely a transmitter RAM not in a FULL state.

The device A 400 and the device B 500 have their receiver RAMs 421 and 521 for storing every packet type, so that the transmitter RAM FULL signal is asserted for every packet type. For example, when the receiver RAM for the Type 1 packet type falls in a FULL state in the receiver RAM 421 of the device A 400, the transmitter-to-Device A RAM FULL signal 342 with respect to the Type 1 packet type is asserted. In this case, the transmission packet type management unit 312 detects that the transmitter-to-Device A RAM FULL signal 342 to the packet type of Type 1 has been asserted, and transmits the transmission packet type instruction signal 321 to the packet selection output circuit 315 to select and output packets other than those of the packet type of Type 1 having the device A as a destination according to the receiving order from CPU 200 to the switch circuit 300. Therefore, the packet selection output circuit 315 selects from the receiver RAM 311 the packets other than those of the packet type of Type 1 having the device A as the destination according to the receiving order from CPU 200 to the switch circuit 300 and outputs to the transmitting-to-Switch circuit receiver unit route 332. The configuration of holding the destination information in addition to the receiving order is changed, so that it becomes possible to transfer the packet addressed to another device without waiting for the arrival of a write request if clogging occurs.

In the embodiment not using the destination information of the above packet, when a FULL state of the transmitter RAM for a read packet type addressed to one device is detected by the above-described transmitter RAM FULL signal, transmission to the transmitter RAM for the read packet type addressed to another device cannot be made either. But, the configuration having the destination information of the above packet can transmit the read packet type addressed to another device even if the FULL state of the transmitter RAM for the read packet type addressed to one device is detected.

Figure 7:
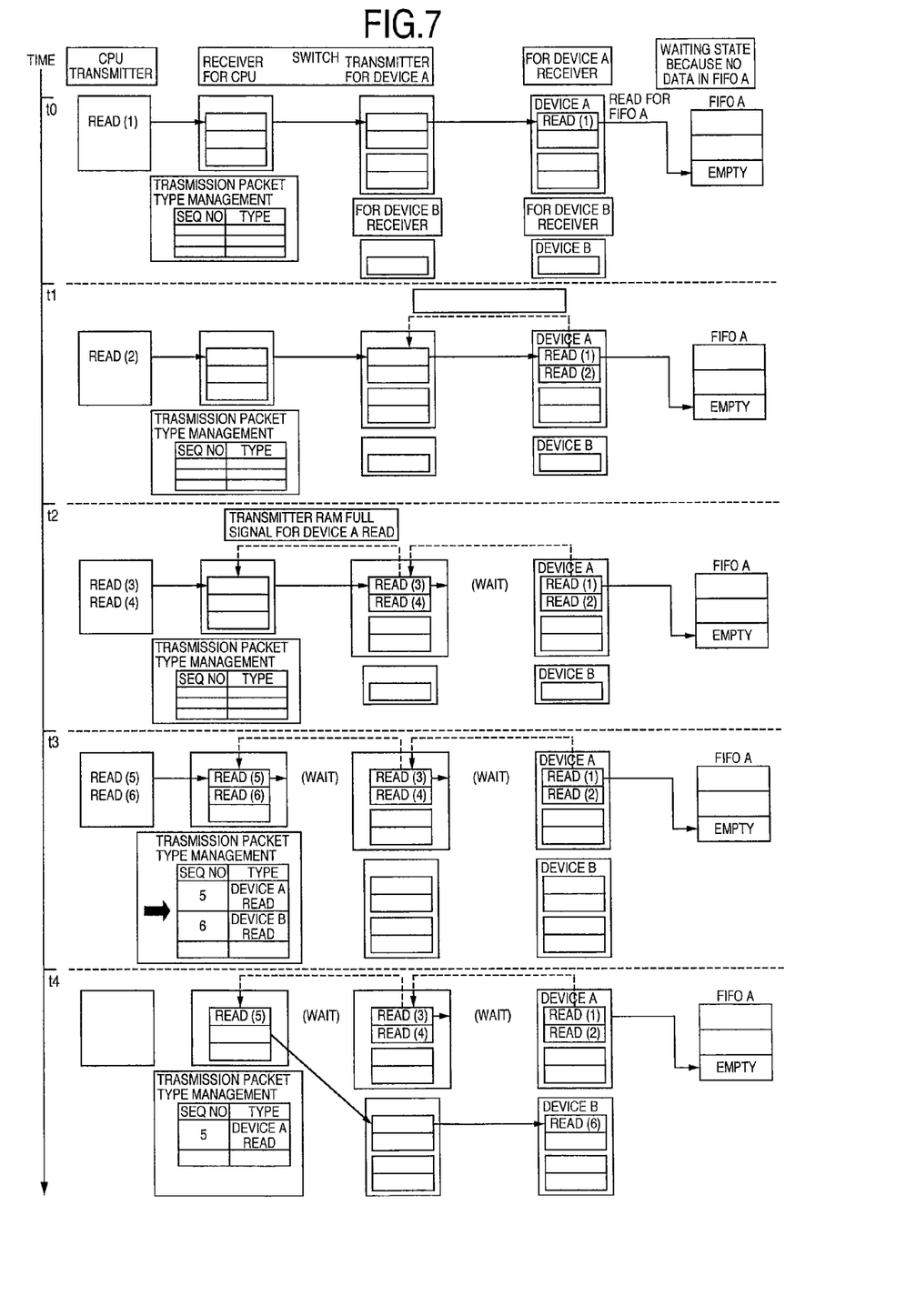
FIG. 7 is a ladder chart at the time of occurrence of overtaking between packets addressed to different devices.

FIG. 7 is a ladder chart of overtaking performed between packet types addressed to different devices. The CPU transmitter unit, the receiver-from-CPU unit, the transmitter-to-Device A unit, the transmitter-to-Device B unit, the device A receiver unit, and the device B receiver unit are positioned from left to right, and a time passage is indicated downward. The packet types described here are two types such as a read request and a write request.

The operation from timing t0 to t2 is the same operation as in FIG. 5, and read requests (1), (2), (3) and (4) are transmitted sequentially from the CPU to the device A.

Timing t3 indicates a state that a read request (5) addressed to the device A and a read request (6) addressed to the device B are stored in this order into the receiver unit of the switch circuit. According to the receiving order, read (5) should be transmitted, but the transmitter-to-Device A unit 340 is already in a FULL state by storing the read request (3) and the read request (4), and the read (5) cannot be transferred from the receiver-from-CPU unit 310. But, since this circuit holds the destination information of the packet by the transmission packet type management unit 312, the packet addressed to the device B can be transferred even if the read requests addressed to the device A are clogged. First, the transmission packet type management unit 312 searches for packets transmittable in the receiving order among the packets stored in the receiver-from-CPU RAM 311 of the switch circuit. The read request (5) to the device A is the first in the receiving order, but the read transmitter-to-Device A RAM of the switch circuit is in a FULL state, and the transmitter RAM FULL signal for device A READ is asserted. Therefore, it is judged that the read request addressed to the device A cannot be sent. Then, the transmission packet type management unit 312 sees the destination of the read request (2) which is the second in the receiving order to know that it is addressed to the device B, judges that the transmission is possible and transmits it.

Timing t4 indicates a state that the read request (6) addressed to the device B is stored in the receiver unit of the device B after overtaking the read request (5) addressed to the device A. Thus, a packet to another device can be transmitted without waiting a write request by placing destination information in addition to the receiving order information into the transmission packet type management unit 312.

Figure 8:
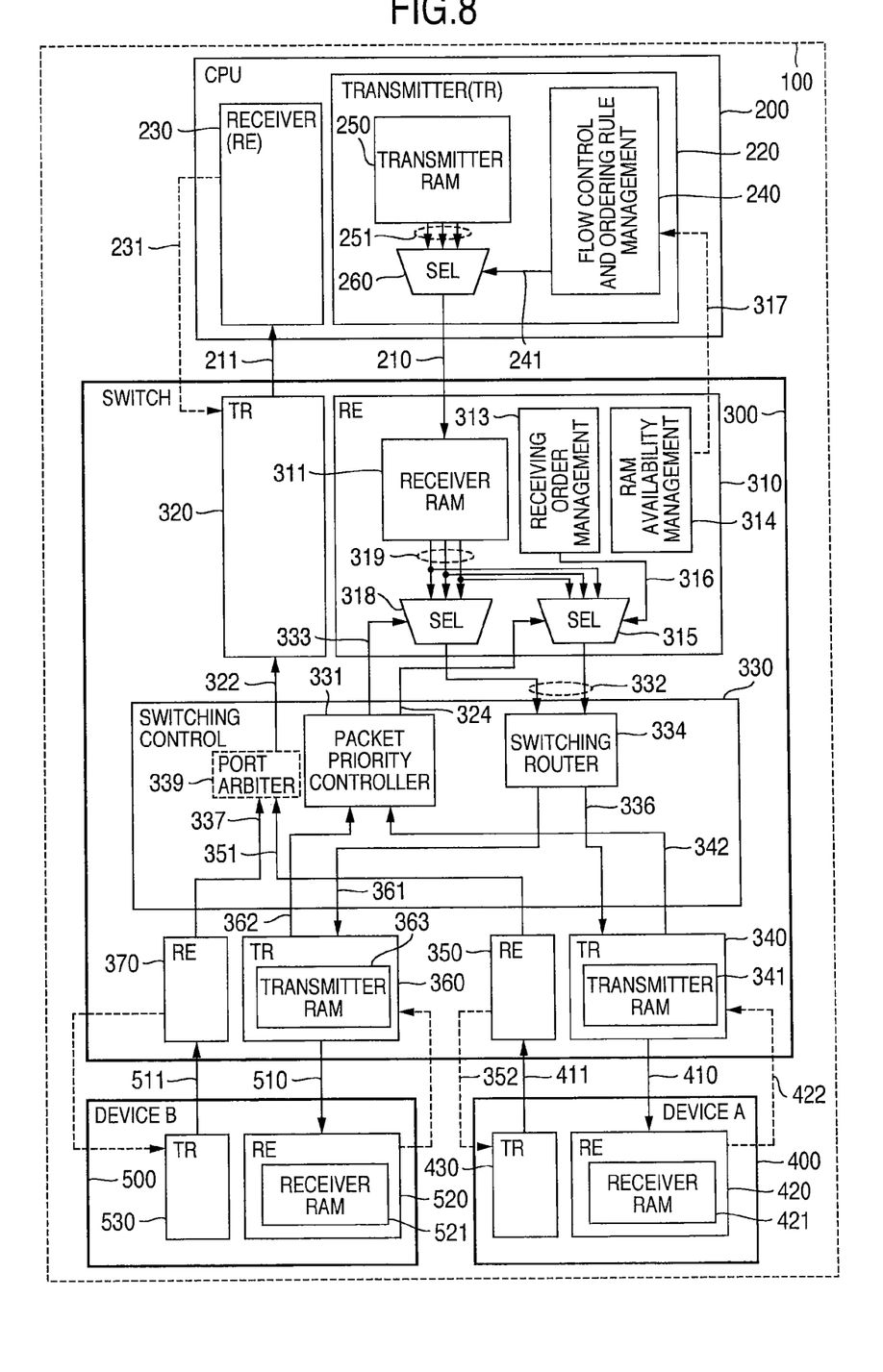
FIG. 8 is a block diagram of a switch circuit according to an embodiment of the invention.

FIG. 8 is still another embodiment of the information processing apparatus 100 using the switch circuit 300 of the invention. In this circuit, a priority packet selection output circuit 318 for priority packet transfer is disposed in addition to the packet selection output circuit 315 for transfer of the receiving order. In comparison with the packet selection output circuit 315 disposed in FIG. 1, the packet selection output circuit disposed in FIG. 8 selects and outputs only the receiving order output packet, and the priority packet is selected and outputted from only the priority packet selection output circuit 318.

The Priority Packet Type Selection instruction unit 331 refers to the transmitter-to-Device A RAM FULL signal 342 and the transmitter-to-Device B RAM FULL signal 362, and to select packet types in the receiving order, outputs a receiving order output signal 324 to the packet selection output circuit 315, and to select a priority packet, outputs the priority packet type selection instruction signal 333 to the priority packet selection output circuit 318. When the receiving order transfer is instructed by the receiving order output signal 324, the packet selection output circuit 315 transmits to the switching control unit 330 the packet selected by the receiving order output instruction signal 316 through the switch circuit receiver unit transmitting route 332. The priority packet selection output circuit 318 transmits to the switching control unit 330 the packet selected by the priority packet type selection instruction signal 333 when the priority packet is selected through the switch circuit receiver unit transmitting route 332. Thus, the packet selection output circuit exclusively for the priority packet type is used to achieve the above-described object.

It was mainly described above that the invention achieved by the present inventor was applied to the PCI Express standard of a technical field as its background, but the invention is not limited to the PCI Express. For example, it can be applied to a case where data is transferred in accordance with a protocol similar to the PCI Express.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A switching device for switching packets having a plurality of packet types to a plurality of devices according to a PCI Express protocol, the switching device comprising:
   a receiver adapted to receive packets inputted into the switching device, the receiver having a buffer; and
   a transmitter adapted to transmit packets to a first device in the plurality of devices, the transmitter having a buffer provided for each packet type;
   when a remaining capacity of a first transmitter buffer which stores a first packet type becomes insufficient, the transmitter transmits to the receiver a first signal indicating that the remaining capacity of the first transmitter buffer has become insufficient,
   when the receiver receives the first signal, the receiver transmits packets to the transmitter which are not of the first packet type according to a receiving order of the packets, and
   when the receiver does not receive the first signal, the receiver transmits the packets to the transmitter according to the receiving order.

2. The switching device according to claim 1, further comprising:
   a receiver memory,
   a receiving order management unit for storing the receiving order of the packets,
   a priority packet type selection circuit,
   a packet selection output circuit, and
   a packet type instruction circuit, wherein
   the receiver memory performs a first-in first-out operation of the packets for each of the packet types according to the receiving order,
   the priority packet type selection circuit selects and outputs packets from the receiver memory according to packet type,
   when the priority packet type selection circuit receives the first signal, the priority packet type selection circuit transmits a second signal for prohibiting transfer of packets of the first packet type to the packet type instruction circuit,
   the receiving order management unit transmits to the packet type instruction circuit a third signal indicating a packet type to be transferred according to the receiving order,
   when the packet type instruction circuit receives the second signal, the packet type instruction circuit determines a packet type corresponding to a packet which is other than the first packet type and which has arrived first according to the second signal and the third signal, and transmits a fourth signal indicating the determined packet type to the packet selection output circuit, and
   when the packet selection output circuit receives the fourth signal, the packet type selection circuit selects and transfers the packet of the determined packet type indicated by the fourth signal from the receiver memory.

3. The switching device according to claim 2, wherein
   if the packet type instruction circuit does not receive the second signal, the packet type instruction circuit determines the packet type corresponding to the first-arrived packet according to the third signal and transmits the fourth signal indicating the determined packet type to the packet selection output circuit.

4. A switching device for switching packets having a plurality of packet types to a plurality of devices according to a PCI Express protocol, wherein
   the plurality of devices each has a receiver memory adapted to store packets,
   when a remaining capacity of the receiver memory of a first device with respect to a first packet type the packet types becomes insufficient, the first device transmits to a switching device a first signal indicating that the remaining capacity of the receiver memory with respect to individual packet types has become insufficient,
   when the switching device receives the first signal, the switching device transfers packets which have destinations other than the first device according to a packet receiving order, and
   when the switching device does not receive the first signal, the switching device transfers individual packets according to the packet receiving order.

5. The switching device according to claim 4, comprising:
   a receiver memory,
   a transmission packet type management unit for storing the packet receiving order and destinations of individual packets, and
   a packet selection output circuit, wherein
   when the transmission packet type management unit receives a first signal, the transmission packet type management unit transmits to the packet selection output circuit a second signal indicating a packet which is a destination other than the first device and corresponds to a first-arrived packet according to the receiving order and the destination, and
   when the packet selection output circuit receives the second signal, the packet type selection circuit selects and transfers a packet indicated by the second signal from the receiver memory.

6. The switching device according to claim 5, wherein
   when the packet type instruction circuit does not receive the second signal, packet corresponding to the first-arrived packet is transmitted to the packet selection output circuit according to the packet receiving order.

7. The switching device according to claim 1, wherein one of the packet types is one of Posted indicating a write request, NonPosted indicating a read request, and Completion indicating a reply to a read request.

8. The switching device according to claim 1, wherein one of the devices is one of a storage medium control device, an image processing control device, and a communication control device.

\* \* \* \* \*